US010091100B1

(12) United States Patent
Duerk (10) Patent No.: US 10,091,100 B1
(45) Date of Patent: Oct. 2, 2018

(54) NETWORK FUNCTIONS VIRTUALIZATION INFRASTRUCTURE COMPRISING VIRTUAL SWITCH FOR INTERNET OF THINGS DATA (71) Applicant: EMC Corporation, Hopkinton, MA (US)

(72) Inventor: Bryan Duerk, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 341 days.

(21) Appl. No.: 15/079,896

(22) Filed: Mar. 24, 2016

(51) Int. Cl.
H04L 12/713 (2013.01)
H04L 29/08 (2006.01)
H04L 12/851 (2013.01)
H04W 4/38 (2018.01)

(52) U.S. Cl.
CPC ............ H04L 45/586 (2013.01); H04L 47/24 (2013.01); H04L 67/10 (2013.01); H04W 4/38 (2018.02)

(58) Field of Classification Search
CPC .......... H04W 4/38; H04W 4/70; H04L 47/20; H04L 47/24; H04L 47/2416; H04L 47/50; H04L 67/12; H04L 67/2842; H04L 67/327; H04L 12/4641; H04L 12/66
See application file for complete search history.

(56) References Cited

U.S. PATENT DOCUMENTS

2012/0257571 A1* 10/2012 Liao ................. H04W 4/70
370/328

2013/0322274 A1* 12/2013 Zakrzewski ........ H04W 28/021
370/252
2014/0201374 A1 7/2014 Ashwood-Smith et al.
(Continued)

FOREIGN PATENT DOCUMENTS

WO 2011131066 A1 10/2011

OTHER PUBLICATIONS

European Telecommunications Standards Institute (ETSI), "Network Functions Virtualisation (NFV); Use Cases," ETSI GS NFV 001, V1.1.1, Oct. 2013, 50 pages.
(Continued)

Primary Examiner — Oussama Roudani
(74) Attorney, Agent, or Firm — Ryan, Mason & Lewis, LLP (57) ABSTRACT An apparatus in one embodiment comprises a processing platform configured to implement network functions virtualization infrastructure. The network functions virtualization infrastructure comprises a virtual switch configured to communicate with a plurality of endpoint devices over a first network. The processing platform further comprises a message buffer, and an uplink transmitter configured to communicate with cloud infrastructure over a second network. The virtual switch is configured to separate traffic received from the endpoint devices over the first network into at least first and second portions. The first portion comprises IoT data traffic from a first subset of the endpoint devices that are identified as respective IoT endpoint devices, and is provided to the message buffer. The second portion comprises non-IoT data traffic from a second subset of the endpoint devices that are not identified as respective IoT endpoint devices, and is provided directly via the uplink transmitter to the cloud infrastructure.

20 Claims, 4 Drawing Sheets

(56) References Cited

U.S. PATENT DOCUMENTS

| | | | |
|---|---|---|---|
| 2014/0241247 A1* | 8/2014 | Kempf | H04L 12/4633 370/328 |
| 2014/0317261 A1 | 10/2014 | Shatzkamer et al. | |
| 2015/0169768 A1 | 6/2015 | Xu et al. | |
| 2015/0381737 A1 | 12/2015 | Quinn et al. | |
| 2017/0187642 A1* | 6/2017 | Nolan | H04W 4/70 |

OTHER PUBLICATIONS

European Telecommunications Standards Institute, "Network Functions Virtualisation," Introductory White Paper, presented at the SDN and OpenFlow World Congress, http://portal.etsi.org/NFV/NFV_White_Paper.pdf, Oct. 22-24, 2012, pp. 1-16, Issue 1, Darmstadt, Germany.

European Telecommunications Standards Institute, "Network Functions Virtualisation (NFV)," Update White Paper, presented at the SDN and OpenFlow World Congress, http://portal.etsi.org/NFV/NFV_White_Paper2.pdf, Oct. 15-17, 2013, pp. 1-16, Issue 1, Frankfurt, Germany.

M. Mangili et al., "Stochastic Planning for Content Delivery: Unveiling the Benefits of Network Functions Virtualization," The 22nd IEEE International Conference on Network Protocols (ICNP), Oct. 2014, 6 pages.

S. Aleksic et al., "Network Virtualization: Paving the Way to Carrier Clouds (invited)," 16th International Telecommunications Network Strategy and Planning Symposium (Networks), Sep. 2014, pp. 1-6, Funchal, Madeira Island, Portugal.

M. Chiosi et al., "Network Functions Virtualisation—An Introduction, Benefits, Enablers, Challenges & Call for Action," Introductory White Paper, SDN and OpenFlow World Congress, Oct. 2012, pp. 1-16, No. 1, Darmstadt, Germany.

Wikipedia, "Network Functions Virtualization," http://en.wikipedia.org/wiki/Network_Functions_Virtualization, Nov. 2014, 4 pages.

R. Jain, "OpenFlow, Software Defined Networking (SDN) and Network Function Virtualization (NFV)," Washington University in St. Louis, http://www.cse.wustl.edu/~jain/tutorials/icc14.htm, 2014, 93 pages.

* cited by examiner

NETWORK FUNCTIONS VIRTUALIZATION INFRASTRUCTURE COMPRISING VIRTUAL SWITCH FOR INTERNET OF THINGS DATA

FIELD

The field relates generally to information processing systems, and more particularly to techniques for implementing network functions virtualization infrastructure in information processing systems.

BACKGROUND

Information processing systems increasingly utilize reconfigurable virtual resources to meet changing user needs in an efficient, flexible and cost-effective manner. For example, cloud computing and storage systems implemented using virtual resources have been widely adopted. More recently, network functions virtualization techniques have been proposed for use by telecommunication system and cable system service providers. Conventional aspects of such techniques are disclosed in European Telecommunications Standards Institute (ETSI), ETSI GS NFV 001, V1.1.1, "Network Functions Virtualisation (NFV): Use Cases," October 2013, which is incorporated by reference herein. See also the Introductory and Updated White Papers entitled "Network Functions Virtualisation," presented at the SDN and OpenFlow World Congress, Oct. 22-24, 2012 and Oct. 15-17, 2013, respectively, which are incorporated by reference herein.

However, despite these and other recent advances in virtualization techniques, a need remains for further improvements. For example, performance and scalability can be adversely impacted in systems that process the extremely large amounts of data generated by distributed sensors, smart appliances, smart automobiles or other types and arrangements of devices associated with the Internet of Things (IoT).

SUMMARY

Illustrative embodiments of the present invention provide network functions virtualization infrastructure configured to implement a virtual switch for efficient processing of data from IoT devices. The virtual switch interacts with a message buffer that is configured to store IoT data for delivery to a cloud computing or storage system, a cloud data center or other type of cloud infrastructure.

In one embodiment, an apparatus comprises a processing platform configured to implement network functions virtualization infrastructure. The network functions virtualization infrastructure comprises a virtual switch configured to communicate with a plurality of endpoint devices over a first network. The processing platform further comprises a message buffer, and an uplink transmitter configured to communicate with cloud infrastructure over a second network. The virtual switch is configured to separate traffic received from the endpoint devices over the first network into at least first and second portions.

The first portion of the received traffic comprises IoT data traffic from a first subset of the endpoint devices that are identified as respective IoT endpoint devices, and is provided to the message buffer. The second portion of the received traffic comprises non-IoT data traffic from a second subset of the endpoint devices that are not identified as respective IoT endpoint devices, and is provided to the uplink transmitter for delivery to the cloud infrastructure in a manner that bypasses the message buffer.

In some embodiments, the first portion of the traffic is subject to one or more additional processing operations in the message buffer and at least part of the first portion is subsequently provided from the message buffer to the uplink transmitter for delivery to the cloud infrastructure responsive to satisfaction of one or more designated conditions.

A given one of the one or more designated conditions may comprise availability of a threshold amount of bandwidth for delivery of at least part of the first portion of the received traffic from the uplink transmitter to the cloud infrastructure.

Examples of the one or more additional operations include filtering operations and local triggering operations.

In one illustrative embodiment, a particular message of the first portion identified by a filtering operation as a priority message is forwarded to the uplink transmitter for delivery to the cloud infrastructure on a priority basis before other messages of the first portion that are not so identified.

In another illustrative embodiment, a particular message of the first portion identified by a local triggering operation as requiring an automated local response is returned to the virtual switch for delivery to a local endpoint device via the first network.

Illustrative embodiments can provide significant advantages relative to conventional arrangements for processing IoT data. For example, processing bottlenecks that might otherwise lead to degraded performance are avoided, and scalability to accommodate potentially very large numbers of IoT devices is achieved.

These and other illustrative embodiments described herein include, without limitation, methods, apparatus, systems, and articles of manufacture comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
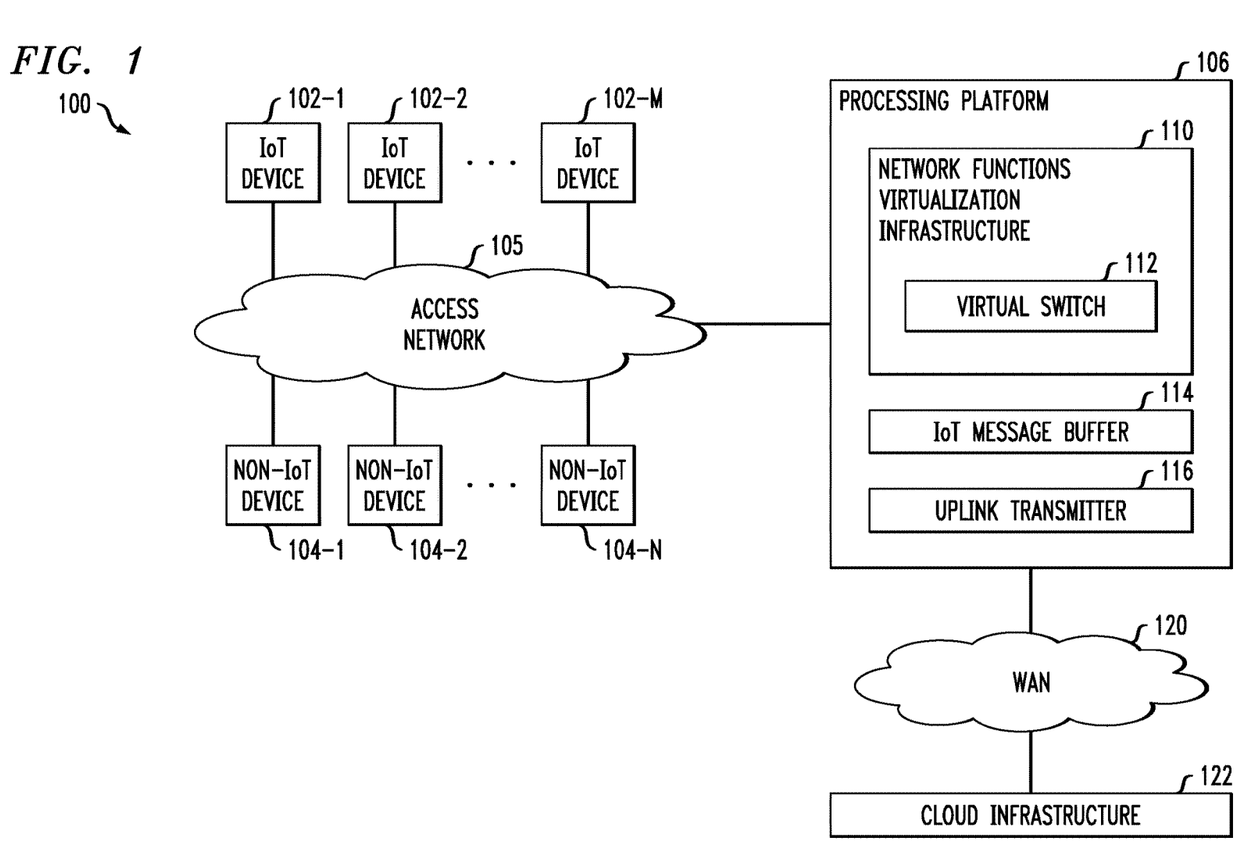
FIG. 1 is a block diagram of an information processing system comprising network functions virtualization infrastructure implementing a virtual switch that interacts with a message buffer in an illustrative embodiment of the invention.

FIG. 1 shows an information processing system 100 configured in accordance with an illustrative embodiment of the present invention. The information processing system 100 comprises a plurality of IoT devices 102-1, 102-2, . . . 102-M and a plurality of non-IoT devices 104-1, 104-2, . . . 104-N, all coupled via an access network 105 to a processing platform 106. The processing platform 106 is assumed to comprise a plurality of processing devices each having a processor coupled to a memory. One or more such processing devices may be implemented at least in part utilizing one or more virtual machines, containers or other types of virtualization infrastructure. Examples of processing platform implementations will be described below in conjunction with FIGS. 4 and 5.

The IoT devices 102 in this embodiment comprise, for example, distributed sensors, smart appliances, smart automobiles or other types and arrangements of devices that generate various types of IoT data traffic.

The non-IoT devices 104 in this embodiment comprise, for example, desktop, laptop or tablet computers, mobile telephones, or other types and arrangements of devices that generate various types of non-IoT data traffic.

The IoT devices 102 and non-IoT devices 104 are examples of what are more generally referred to as "endpoint devices" of the system 100. Other types of endpoint devices can be used in other embodiments.

It should be noted in this regard that one or more other endpoint devices of the system 100 can illustratively comprise hybrid devices that generate both IoT data traffic and non-IoT data traffic. For example, a given endpoint device can be configured so as to generate IoT data traffic in some operating modes of the device and to generate non-IoT data traffic in other operating modes of the device.

Some endpoint devices in illustrative embodiments can be associated with respective system users. The term "user" in this context and elsewhere herein is intended to be broadly construed so as to encompass, for example, human, hardware, software or firmware entities, as well as various combinations of such entities.

The access network 105 illustratively comprises a wireless network such as a cellular network, a WiMAX network or a WiFi network, or a combination of multiple such wireless networks. The access network 105 more particularly includes one or more base stations that support one or more air interfaces over which the base stations communicate with the devices 102 and 104.

The processing platform 106 is configured to implement network functions virtualization infrastructure 110, with the network functions virtualization infrastructure 110 comprising at least one virtual switch 112 configured to communicate with the IoT devices 102 and the non-IoT devices 104 over the access network 105. In some embodiments, the virtual switch 112 more particularly comprises a virtual IoT gateway.

The processing platform 106 further comprises an IoT message buffer 114 and an uplink transmitter 116. The uplink transmitter 116 is configured to communicate over a wide area network (WAN) 120 with cloud infrastructure 122. The WAN 120 may comprise portions of the Internet or other types of WANs. The cloud infrastructure 122 in some embodiments comprises a data center or other type of cloud infrastructure implemented on a processing platform that is geographically remote from or otherwise separate from the processing platform 106 that comprises the network functions virtualization infrastructure 110.

Although shown in the FIG. 1 embodiment as being separate from the network functions virtualization infrastructure 110, one or both of the IoT message buffer 114 and the uplink transmitter 116 in other embodiments can be implemented at least in part within the network functions virtualization infrastructure 110. For example, in some embodiments, the IoT message buffer 114 comprises a replicated message buffer implemented by a dynamically-reconfigurable server cluster. Messages stored in a replicated message buffer of this type are replicated across two or more servers of the cluster. Such a server cluster arrangement facilitates non-disruptive scaling of the local storage to handle increased message growth. The dynamically-reconfigurable server cluster in some embodiments is illustratively implemented as part of the network functions virtualization infrastructure 110.

The IoT message buffer 114 is an example of what is more generally referred to herein as a "message buffer." It should be noted that the term "message" as used in this context is intended to be broadly construed, and should not be interpreted as requiring any particular message format or messaging protocol.

It is to be appreciated that the virtual switch 112 and the IoT message buffer 114 can be implemented within respective separate physical systems in some embodiments. Alternatively, the virtual switch 112 and the IoT message buffer can be part of the same physical system in a given embodiment. A processing platform such as processing platform 106 in the FIG. 1 embodiment can therefore be implemented as a combination of multiple distinct physical systems or as a single physical system.

The virtual switch 112 of the network functions virtualization infrastructure 110 is configured to separate traffic received from the devices 102 and 104 over the access network 105 into at least first and second portions.

The first portion of the received traffic comprises IoT data traffic from a first subset of the devices that are identified as respective IoT endpoint devices. These devices illustratively include one or more of the IoT devices 102. The first portion of the received traffic is provided by the virtual switch 112 to the IoT message buffer 114 and is subject to one or more additional processing operations in the IoT message buffer 114.

The second portion of the received traffic comprises non-IoT data traffic from a second subset of the devices that are not identified as respective IoT endpoint devices. These illustratively include one or more of the non-IoT devices 104. The second portion of the received traffic is provided by the virtual switch 112 to the uplink transmitter 116 for delivery to the cloud infrastructure 122 via WAN 120 in a manner that bypasses the IoT message buffer 114.

In some embodiments, one or more of the IoT devices 102 are respective endpoint devices that have registered with the virtual switch 112 as IoT devices, and one or more of the non-IoT devices 104 are respective endpoint devices that have not registered with the virtual switch 112 as IoT devices. Such registration for a given one of the devices 102 may involve, for example, registering an IP address or other network information of the given device with the virtual switch 112 such that the virtual switch can distinguish data traffic from that device as comprising IoT data traffic. The virtual switch 112 in an embodiment of this type illustratively comprises an IP networking switch that separates the received traffic into the first and second portions utilizing IP information of the received traffic.

It should be understood, however, that other embodiments do not require any of the IoT devices to be registered with the virtual switch 112 in order for that switch to separate received traffic into first and second portions as previously described.

At least part of the first portion of the received traffic is subsequently provided from the IoT message buffer 114 to the uplink transmitter 116 for delivery to the cloud infrastructure 122 responsive to satisfaction of one or more designated conditions.

For example, a given one of the one or more designated conditions illustratively comprises availability of a threshold amount of bandwidth for delivery of at least part of the first portion of the received traffic from the uplink transmitter 116 to the cloud infrastructure 122. Accordingly, IoT data traffic directed from the virtual switch 112 to the IoT message buffer 114 can be stored there until there is sufficient bandwidth available to allow such IoT data traffic to be transmitted over the WAN 120 to the cloud infrastructure 122. Such an arrangement ensures that potentially large amounts of IoT data traffic do not unduly disrupt the ordinary handling of non-IoT data within the system 100.

As noted above, the first portion of the received traffic is provided by the virtual switch 112 to the IoT message buffer 114 and is subject to one or more additional processing operations in the IoT message buffer 114.

For example, a given one of the one or more additional processing operations illustratively comprises a filtering operation. In such an arrangement, a particular message of the first portion that is identified by the filtering operation as a priority message is forwarded to the uplink transmitter 116 for delivery to the cloud infrastructure 122 on a priority basis before other messages of the first portion that are not so identified. One more specific example of a type of prioritized message that needs to be sent to the cloud infrastructure 122 immediately is a message indicating that an airbag has been deployed in a smart automobile. Other types of filtering and message prioritization may be provided.

As another example, a given one of the one or more additional processing operations illustratively comprises a local triggering operation. In such an arrangement, a particular message of the first portion that is identified by the local triggering operation as requiring an automated local response is returned to the virtual switch 112 for delivery to a local endpoint device via the access network 105. Such a local endpoint device illustratively comprises an endpoint device that is associated with a particular one of the IoT devices 102 that generated the message that triggered the need for an automated local response. As a more particular example, a message indicating that a fire alarm sensor or smoke alarm sensor has been activated may trigger an automated local response in the form of activation of a corresponding sprinkler system.

The IoT message buffer 114 in some embodiments is implemented in the form of a store and forward buffer for IoT data comprising messages from the IoT devices 102. For example, messages from registered IoT devices or otherwise being identified as originating from IoT devices can be split from other non-IoT data in the virtual switch 112 and delivered to the IoT message buffer 114 for further processing. Such an arrangement serves to reduce the latency on the remaining traffic. The message buffer contents are illustratively protected locally through replication over multiple servers of a server cluster, and subsequently provided to the cloud infrastructure 122 when sufficient bandwidth is available.

In some embodiments, the virtual switch 112 and IoT message buffer 114 collectively prevent potentially very large amounts of low-priority IoT data from overwhelming the WAN 120 and cloud infrastructure 122. Such an arrangement advantageously provides an extensible solution for handling IoT data in a flexible manner at the network edge. This better allows the system 100 to accommodate the very large numbers of IoT devices that may be generating IoT data for machine learning algorithms and associated data analytics, while avoiding any information loss that might otherwise be associated with excessive filtering of the IoT data. Moreover, additional IoT processing functionality that would be difficult to incorporate in typical simple and inexpensive IoT devices can instead be implemented in an efficient and flexible manner utilizing the IoT message buffer 114 of the processing platform 106. Similar advantages are provided in numerous other embodiments.

It should be understood that the particular IoT devices, non-IoT devices, networks, infrastructure and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 204, and is suitable for use in the system 100 but is more generally applicable to other systems that include network functions virtualization infrastructure comprising at least one virtual switch configured for interaction with an IoT message buffer. Accordingly, references to particular components of the FIG. 1 embodiment in the process description below should not be viewed as limiting in any way, as the disclosed process steps can be applied in other information processing systems, including the information processing system to be described below in conjunction with FIG. 3.

In step 200, network functions virtualization infrastructure is provided. The network functions virtualization infrastructure illustratively comprises at least one virtual switch configured to communicate with a plurality of endpoint devices over an access network. For example, in the context of the system 100, the network functions virtualization infrastructure 110 implemented on processing platform 106 provides a virtual switch 112, illustratively in the form of a virtual IoT gateway. Such an IoT gateway provides local connectivity to the endpoint devices including the IoT devices 102 and the non-IoT devices 104. The virtual switch is coupled to an IoT message buffer 114 which is illustratively implemented outside of the network functions virtualization infrastructure 110 but in other embodiments could be implemented at least in part within that infrastructure.

In step 202, traffic received from the endpoint devices over the access network is separated into at least first and second portions in the virtual switch. The first portion of the received traffic comprises IoT data traffic from a first subset of the endpoint devices that are identified as respective IoT endpoint devices. The second portion of the received traffic comprises non-IoT data traffic from a second subset of the endpoint devices that are not identified as respective IoT endpoint devices. Such identification of particular endpoint devices as IoT endpoint devices can be based in some embodiments on prior registration of such devices with the virtual switch. Additionally or alternatively, particular endpoint devices can be identified as IoT endpoint devices based at least in part on analysis of their corresponding data traffic, device identifiers or other characteristics, such that prior registration of any particular endpoint device with the virtual switch is not required.

In step 204, the first portion of the received traffic is provided to a message buffer, and the second portion of the received traffic is provided to an uplink transmitter for delivery to cloud infrastructure in a manner that bypasses the message buffer. For example, again in the context of the system 100, IoT data traffic from one or more of the IoT devices 102 is directed by the virtual switch 112 to the IoT message buffer 114 for further processing, while non-IoT data traffic from one or more of the non-IoT devices 104 is directed by the virtual switch 112 to the uplink transmitter 116 for delivery to the cloud infrastructure 122.

Figure 2:
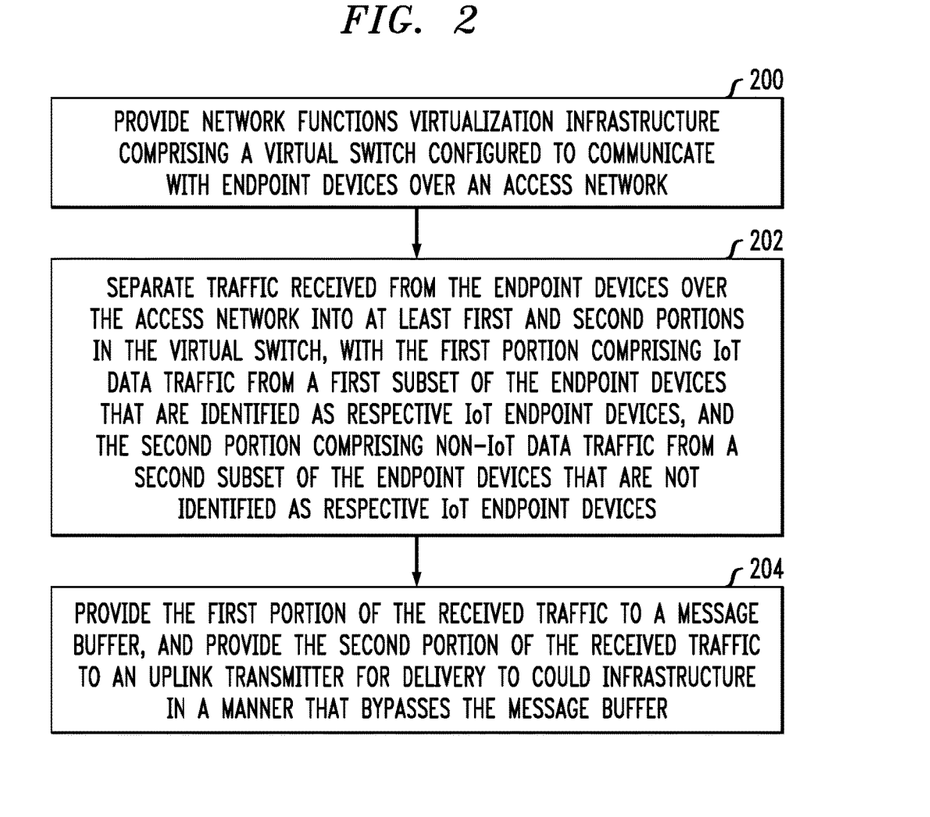
FIG. 2 is a flow diagram of an exemplary process involving the virtual switch of the network functions virtualization infrastructure and an associated message buffer in the information processing system of FIG. 1.

It should be noted that the process of FIG. 2 may include one or more additional steps. For example, in some embodiments the process further includes steps of subjecting the first portion of the traffic to one or more additional processing operations in the message buffer, and providing at least part of the first portion from the message buffer to the uplink transmitter for delivery to the cloud infrastructure responsive to satisfaction of one or more designated conditions. As mentioned previously, an example of such a designated condition illustratively comprises availability of a threshold amount of bandwidth for delivery of at least part of the first portion of the received traffic from the uplink transmitter to the cloud infrastructure. Other additional or alternative designated conditions may be applied in other embodiments.

The particular processing operations and other system functionality described in conjunction with the flow diagram of FIG. 2 are presented by way of illustrative example only, and should not be construed as limiting the scope of the invention in any way. Alternative embodiments can use other types of processing operations comprising network functions virtualization infrastructure implementing a virtual switch that operates in conjunction with an IoT message buffer. For example, the ordering of the process steps may be varied in other embodiments, or certain steps may be performed concurrently with one another rather than serially. Also, one or more of the process steps may be repeated periodically for different processing instances, or performed in parallel with one another for different processing instances.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Another illustrative embodiment will now be described in more detail with reference to FIG. 3, which as indicated previously comprises FIGS. 3A and 3B.

Figure 3A:
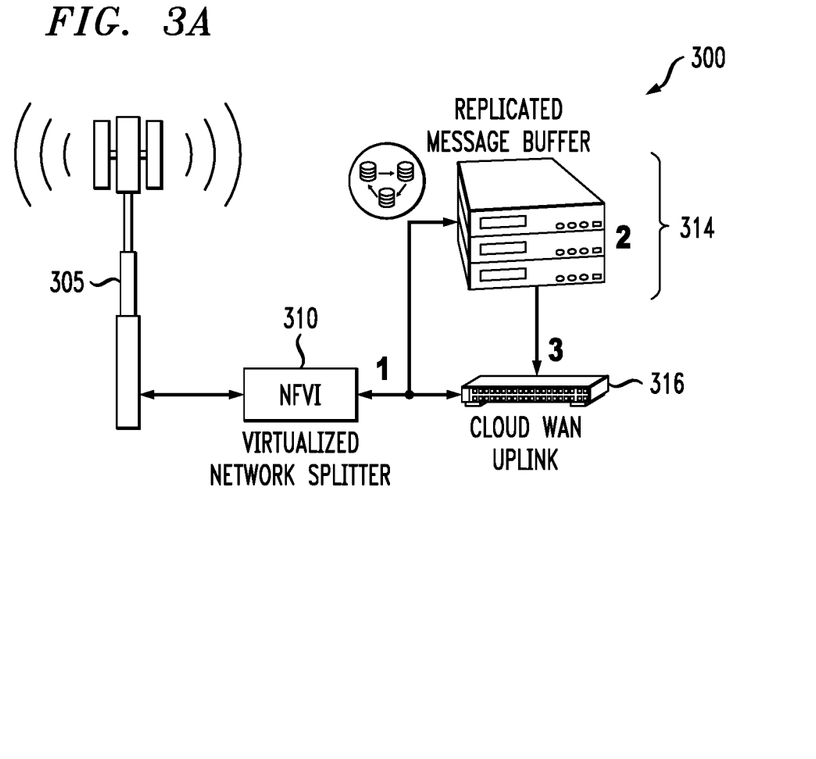
FIGS. 3A and 3B illustrate the operation of another illustrative embodiment of an information processing system comprising a virtual switch provided by network functions virtualization infrastructure. These two figures are also collectively referred to herein as FIG. 3.

Referring initially to FIG. 3A, an information processing system 300 comprises a base station 305 of an access network. The system 300 further comprises network functions virtualization infrastructure 310, also denoted NFVI in the figure, a message buffer 314 and an uplink transmitter 316.

The NFVI 310 in this embodiment implements a virtualized network splitter that is coupled to the base station 305. The virtualized network splitter is an example of what is referred to herein as a virtual IoT gateway or more generally as a virtual switch. The virtualized network splitter of the NFVI 310 is coupled to the message buffer 314 and to the uplink transmitter 316.

The message buffer 314 in this embodiment more particularly comprises a replicated message buffer implemented by a dynamically-reconfigurable server cluster. As mentioned previously, messages stored in a replicated message buffer of this type are replicated across two or more servers of the cluster. The server cluster is illustratively shown in the figure as comprising a set of three servers, although more or fewer servers could be used in other embodiments. Also, in alternative embodiments, at least portions of such a server cluster can be part of the NFVI 310. The message buffer 314 provides a local repository for the IoT data traffic arriving from the base station 305.

The uplink transmitter 316 in this embodiment more particularly comprises a cloud WAN uplink as shown. Other types of uplink transmitters can be used in other embodiments, and terms such as "uplink" and "transmitter" as used herein are intended to be broadly construed so as to encompass a wide range of different types of transmission equipment suitably for transmitting data to cloud infrastructure.

As illustrated in FIG. 3A, network traffic received by the virtualized network splitter of the NFVI 310 from the base station 305 is split into two portions, a first portion comprising IoT data traffic from endpoint devices that are identified as respective IoT devices and a second portion comprising non-IoT data traffic from endpoint devices that not identified as respective IoT devices. This separation of the received traffic into first and second portions by the virtualized network splitter, along with delivery of the first portion to the uplink transmitter 316, corresponds to step 1 in the figure, and is part of a process that includes steps 1, 2 and 3 as shown. In step 2 of the process, the second portion of the received traffic is provided to the message buffer 314 for further processing, and in step 3 of the process, at least part of that second portion is subsequently provided by the message buffer 314 to the uplink transmitter 316.

Accordingly, in this embodiment, IoT data traffic is removed by the virtualized network splitter from a primary stream of network traffic arriving from the base station 305 and provided to the message buffer 314. The remaining portion of the primary stream of network traffic which comprises the non-IoT data traffic is provided by the virtualized network splitter directly to the uplink transmitter 316 for transmission to cloud infrastructure. This illustratively represents substantially normal upstream delivery for that portion of the primary stream of network traffic arriving from the base station 305.

At least part of the IoT data traffic that is diverted by the virtualized network splitter of the NFVI 310 to the message buffer 314 can be held in the message buffer 314 until such time that the WAN uplink is not fully utilized. For example, accumulated IoT data traffic can be uploaded to the cloud infrastructure at certain times of known low utilization of the WAN uplink by normal non-IoT data traffic.

The delivery of the accumulated IoT data traffic can be transmitted on a push basis initiated by the message buffer 314 or on a pull basis initiated by the cloud infrastructure. In an arrangement of the latter type, the cloud infrastructure can identify a given period of low utilization of the WAN uplink and issue a pull command to the message buffer 314 or the uplink transmitter 316 in order to initiate transmission of the accumulated IoT data traffic. Numerous other techniques can be used to trigger delivery of IoT data from the message buffer 314 to the cloud infrastructure via the uplink transmitter 316.

Figure 3B:
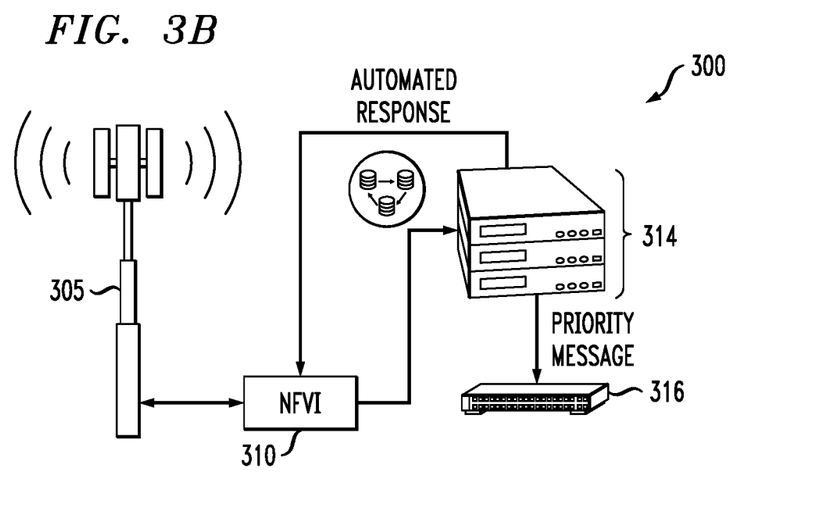

Referring now to FIG. 3B, additional processing functionality implemented in the message buffer 314 is illustrated. In this embodiment, the message buffer 314 is configured to perform filtering and local triggering operations on the IoT data received from the virtualized network splitter of the NFVI 310.

In a given one of the filtering operations, a particular message of the IoT data is identified by the message buffer 314 as a priority message. The identified priority message is forwarded by the message buffer 314 to the uplink transmitter 316 for delivery to the cloud infrastructure on a priority basis before other messages of the IoT data that are not identified as priority messages in the given filtering operation. Such an arrangement allows priority messages meeting specified criteria to be forwarded immediately to the cloud infrastructure.

A wide variety of different criteria may be used in identifying priority messages in the message buffer 314. Also, multiple levels of priority may be used, each having a different message handling process.

In a given one of the local triggering operations, a particular message of the IoT data is identified by the message buffer 314 as requiring an automated local response. The identified automated response message is returned to the virtualized network splitter of the NFVI 310 for delivery to a local endpoint device via the base station 305. As with the priority messages, a wide variety of different criteria may be used in identifying messages requiring an automated local response, and multiple response types can be used, each having a different message handling process.

In some implementations of the system 300, the virtualized network splitter of the NFVI 310 comprises an OpenFlow networking switch. Such a switch can be configured to separate the received traffic from the base station 305 into multiple portions based on IP information such as IP address and port tuples. The endpoint devices of the system 300 can register their respective IP addresses and other information with the OpenFlow networking switch on an individual basis. Alternatively, a subnet can be provided for a corresponding group of endpoint devices using the Dynamic Host Configuration Protocol (DHCP). The OpenFlow networking switch utilizes such information in separating received traffic into IoT data traffic and non-IoT data traffic. Other types of virtual switches implemented using network functions virtualization infrastructure can be used in other embodiments.

The message buffer 314 of the system 300 in some implementations comprises an open source message handler, such as the Apache Kafka open source message broker. Apache Kafka is a robust, high-throughput message broker. It illustratively operates in conjunction with at least one co-located open source server, such as a Node.js server, which also forms a part of the message buffer 314. Such a server can be used to handle security authorization, filtering and local triggering operations, and WAN optimization workflows. The message buffer 314 can additionally comprise specialized flash hardware that incorporates a stream-optimized wear-leveling algorithm to accommodate streams of IoT data.

An implementation of this type combines flash storage and a high-throughput message broker with a virtual switch to provide distributed store and forward buffering functionality for efficient handling of IoT data streams. Other types of message brokers, servers, flash hardware or other system components can be used in other embodiments.

Illustrative embodiments such as those described above can provide considerable advantages over conventional arrangements for processing IoT data.

For example, processing bottlenecks that might otherwise lead to degraded performance are avoided, and scalability to accommodate potentially very large numbers of IoT devices is achieved.

In addition, the need for a separate infrastructure of specialized IoT switches for local handling of IoT data traffic is avoided. Also, potentially large amounts of IoT data traffic can be handled in a particularly efficient and flexible manner without interfering with normal processing of non-IoT data traffic.

Moreover, the use of a virtual switch implemented in network functions virtualization infrastructure in conjunction with a replicated message buffer provides enhanced resilience to failures.

Another advantage of some embodiments is that the provision of additional processing functionality for IoT data is considerably facilitated. For example, as mentioned above, open source components can be used to implement the message buffer in some embodiments in a manner that allows such processing functionality to be introduced using standard server coding tools, libraries and processes, rather than relying on more costly and complex embedded systems design.

It is to be appreciated that the foregoing advantages are illustrative of advantages provided in certain embodiments, and need not be present in other embodiments.

As mentioned previously, at least portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention, such as the information processing system 300 of FIG. 3.

Figure 4:
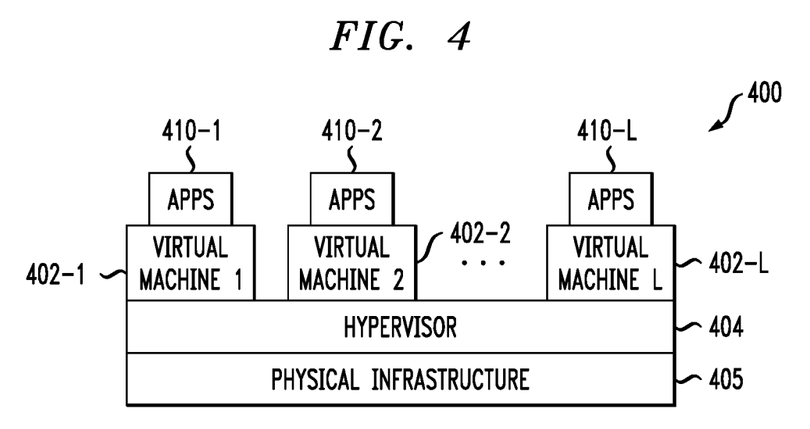
FIGS. 4 and 5 show examples of processing platforms that may be utilized to implement at least a portion of each of the systems of FIGS. 1 and 3.

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 404 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage system in an illustrative embodiment.

More specifically, some embodiments can implement a message buffer utilizing DAS storage configurations comprising local hard drives in respective servers, or in the form of a specialized high-performance buffer using flash storage such as DSSD™ accessible via PCIe connections. Numerous alternative configurations are possible for the message buffer and other components of the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

Figure 5:
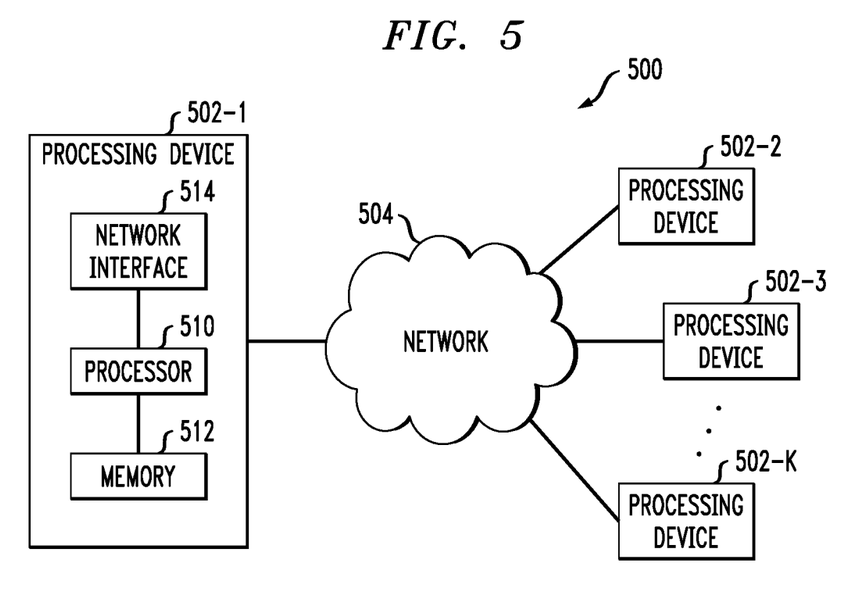

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

As another example, portions of a given processing platform in some embodiments can comprise converged infrastructure such as VxRail™, VxRack™ or Vblock® converged infrastructure commercially available from VCE, the Virtual Computing Environment Company, an EMC Federation Company. More particularly, a message buffer and possibly other system components of the type disclosed herein can be implemented, for example, using DAS on converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems in which it is desirable to facilitate processing of potentially large quantities of IoT data received from various types of IoT devices. Also, the particular configurations of system and device elements shown in the figures can be varied in other embodiments. Thus, for example, the particular type of network functions virtualization infrastructure, virtual switches, message buffers and uplink transmitters deployed in a given embodiment and their respective configurations may be varied. Other features of the illustrative embodiments such as the virtual switching functionality applied to particular types of IoT data can also be varied. Moreover, the various assumptions made above in the course of describing the illustrative embodiments should also be viewed as examples rather than as requirements or limitations of the invention. Numerous other alternative embodiments within the scope of the appended claims will be readily apparent to those skilled in the art.

What is claimed is:

1. An apparatus comprising:
a processing platform comprising a plurality of processing devices each comprising a processor coupled to a memory;
the processing platform being configured to implement network functions virtualization infrastructure;
wherein the network functions virtualization infrastructure comprises a virtual switch configured to communicate with a plurality of endpoint devices over a first network;
the processing platform further comprising:
a message buffer; and
an uplink transmitter configured to communicate with cloud infrastructure over a second network;
wherein the virtual switch is configured to separate traffic received from the endpoint devices over the first network into at least first and second portions;
the first portion of the received traffic comprising Internet of Things (IoT) data traffic from a first subset of the endpoint devices that are identified as respective IoT endpoint devices, with the first portion of the received traffic being provided to the message buffer;
the second portion of the received traffic comprising non-IoT data traffic from a second subset of the endpoint devices that are not identified as respective IoT endpoint devices, with the second portion of the received traffic being provided to the uplink transmitter for delivery to the cloud infrastructure in a manner that bypasses the message buffer;
wherein the first portion of the traffic is subject to one or more additional processing operations in the message buffer;
wherein a given one of the one or more additional processing operations comprises a local triggering operation; and
wherein a particular message of the first portion identified by said local triggering operation as requiring an automated local response is returned to the virtual switch for delivery to a local endpoint device via the first network.

2. The apparatus of claim 1 wherein at least part of the first portion is provided from the message buffer to the uplink transmitter for delivery to the cloud infrastructure responsive to satisfaction of one or more designated conditions.

3. The apparatus of claim 1 wherein at least one of the message buffer and the uplink transmitter are implemented at least in part within the network functions virtualization infrastructure.

4. The apparatus of claim 1 wherein the message buffer comprises a replicated message buffer implemented by a dynamically-reconfigurable server cluster.

5. The apparatus of claim 4 wherein the dynamically-reconfigurable server cluster is part of the network functions virtualization infrastructure.

6. The apparatus of claim 1 wherein the virtual switch comprises a virtual IoT gateway.

7. An apparatus comprising:
a processing platform comprising a plurality of processing devices each comprising a processor coupled to a memory;
the processing platform being configured to implement network functions virtualization infrastructure;
wherein the network functions virtualization infrastructure comprises a virtual switch configured to communicate with a plurality of endpoint devices over a first network;
the processing platform further comprising:
a message buffer; and
an uplink transmitter configured to communicate with cloud infrastructure over a second network;
wherein the virtual switch is configured to separate traffic received from the endpoint devices over the first network into at least first and second portions;
the first portion of the received traffic comprising Internet of Things (IoT) data traffic from a first subset of the endpoint devices that are identified as respective IoT endpoint devices, with the first portion of the received traffic being provided to the message buffer;
the second portion of the received traffic comprising non-IoT data traffic from a second subset of the endpoint devices that are not identified as respective IoT endpoint devices, with the second portion of the received traffic being provided to the uplink transmitter for delivery to the cloud infrastructure in a manner that bypasses the message buffer;
wherein the IoT endpoint devices comprise endpoint devices that have registered with the virtual switch as IoT endpoint devices and the non-IoT endpoint devices comprise endpoint devices that have not registered with the virtual switch as IoT endpoint devices;
the registration of the endpoint devices with the virtual switch as IoT endpoint devices comprising prior registration of Internet Protocol network address information of those endpoint devices with the virtual switch;
the prior registration occurring prior to receipt of the traffic subject to separation.

8. The apparatus of claim 2 wherein a given one of the one or more designated conditions comprises availability of a threshold amount of bandwidth for delivery of at least part of the first portion of the received traffic from the uplink transmitter to the cloud infrastructure.

9. The apparatus of claim 2 wherein a given one of the one or more additional processing operations comprises a filtering operation.

10. The apparatus of claim 9 wherein a particular message of the first portion identified by said filtering operation as a priority message is forwarded to the uplink transmitter for delivery to the cloud infrastructure on a priority basis before other messages of the first portion that are not so identified.

11. The apparatus of claim 1 wherein the first network comprises an access network comprising one or more wireless base stations and the second network comprises a wide area network.

12. The apparatus of claim 1 wherein the virtual switch comprises an IP networking switch that separates the received traffic into the first and second portions utilizing IP information of the received traffic.

13. An information processing system comprising the apparatus of claim 1.

14. A method comprising:
providing network functions virtualization infrastructure comprising a virtual switch configured to communicate with a plurality of endpoint devices over a first network;
separating traffic received from the endpoint devices over the first network into at least first and second portions in the virtual switch;

the first portion of the received traffic comprising Internet of Things (IoT) data traffic from a first subset of the endpoint devices that are identified as respective IoT endpoint devices;

the second portion of the received traffic comprising non-IoT data traffic from a second subset of the endpoint devices that are not identified as respective IoT endpoint devices;

providing the first portion of the received traffic to a message buffer; and providing the second portion of the received traffic to an uplink transmitter for delivery to cloud infrastructure in a manner that bypasses the message buffer;

wherein the first portion of the traffic is subject to one or more additional processing operations in the message buffer;

wherein a given one of the one or more additional processing operations comprises a local triggering operation; and wherein a particular message of the first portion identified by said local triggering operation as requiring an automated local response is returned to the virtual switch for delivery to a local endpoint device via the first network.

15. The method of claim 14 further comprising:

providing at least part of the first portion from the message buffer to the uplink transmitter for delivery to the cloud infrastructure responsive to satisfaction of one or more designated conditions.

16. The method of claim 15 wherein a given one of the one or more designated conditions comprises availability of a threshold amount of bandwidth for delivery of at least part of the first portion of the received traffic from the uplink transmitter to the cloud infrastructure.

17. A computer program product comprising a non-transitory processor-readable storage medium having stored therein program code of one or more software programs, wherein the program code when executed by at least one processing device causes said at least one processing device:

to provide network functions virtualization infrastructure comprising a virtual switch configured to communicate with a plurality of endpoint devices over a first network;

to separate traffic received from the endpoint devices over the first network into at least first and second portions in the virtual switch;

the first portion of the received traffic comprising Internet of Things (IoT) data traffic from a first subset of the endpoint devices that are identified as respective IoT endpoint devices;

the second portion of the received traffic comprising non-IoT data traffic from a second subset of the endpoint devices that are not identified as respective IoT endpoint devices;

to provide the first portion of the received traffic to a message buffer; and to provide the second portion of the received traffic to an uplink transmitter for delivery to cloud infrastructure in a manner that bypasses the message buffer;

wherein the first portion of the traffic is subject to one or more additional processing operations in the message buffer;

wherein a given one of the one or more additional processing operations comprises a local triggering operation; and wherein a particular message of the first portion identified by said local triggering operation as requiring an automated local response is returned to the virtual switch for delivery to a local endpoint device via the first network.

18. The computer program product of claim 17 wherein the program code when executed by said at least one processing device further causes said at least one processing device:

to provide at least part of the first portion from the message buffer to the uplink transmitter for delivery to the cloud infrastructure responsive to satisfaction of one or more designated conditions.

19. The computer program product of claim 17 wherein the message buffer comprises a replicated message buffer implemented by a dynamically-reconfigurable server cluster.

20. The method of claim 14 wherein the message buffer comprises a replicated message buffer implemented by a dynamically-reconfigurable server cluster.

* * * * *